US008771817B2

(12) United States Patent
Puype et al.

(10) Patent No.: US 8,771,817 B2
(45) Date of Patent: Jul. 8, 2014

(54) METHOD FOR APPLYING AN ELASTOMER ON A SHEATH

(75) Inventors: Aline Puype, Crepy en Valois (FR); Lionel Dromain, Crepy en Valois (FR); Francis Gaudelet, Pont Point (FR)

(73) Assignee: Federal Mogul Systems Protection, Crepy en Valois (FR)

( * ) Notice: Subject to any disclaimer, the term of this patent is extended or adjusted under 35 U.S.C. 154(b) by 1071 days.

(21) Appl. No.: 12/669,850

(22) PCT Filed: Jul. 16, 2008

(86) PCT No.: PCT/FR2008/001044

§ 371 (c)(1),
(2), (4) Date: Jan. 20, 2010

(87) PCT Pub. No.: WO2009/030834

PCT Pub. Date: Mar. 12, 2009

(65) Prior Publication Data

US 2010/0196638 A1 Aug. 5, 2010

(30) Foreign Application Priority Data

Jul. 20, 2007 (FR) ..................................... 07 56667

(51) Int. Cl.
*B29D 22/00* (2006.01)
*B29D 23/00* (2006.01)
*B32B 1/08* (2006.01)
*F16L 11/04* (2006.01)

(52) U.S. Cl.
USPC ..... 428/36.91; 428/36.1; 428/36.9; 428/35.7; 118/40; 427/429; 101/108; 101/101; 101/97; 101/98

(58) Field of Classification Search
USPC .............. 428/36.1, 36.9, 36.91, 35.7; 118/40; 427/429; 101/108, 101, 97, 98
See application file for complete search history.

(56) References Cited

U.S. PATENT DOCUMENTS

| | | | | |
|---|---|---|---|---|
| 4,800,872 | A | 1/1989 | Buese et al. | |
| 5,186,992 | A | 2/1993 | Kite, III | |
| 5,866,216 | A * | 2/1999 | Flasher | 428/36.1 |
| 2003/0221567 | A1 | 12/2003 | Catalan et al. | |

FOREIGN PATENT DOCUMENTS

| | | | |
|---|---|---|---|
| EP | 0 333 279 | | 3/1989 |
| EP | 0532500 | B1 | 5/1995 |
| FR | 2 884 752 | | 10/2006 |
| JP | 64-085659 | A | 3/1989 |
| JP | 05-020948 | A | 1/1993 |
| JP | 2003-003375 | A | 1/2003 |
| JP | 2003-251702 | A | 9/2003 |
| WO | 9114034 | | 9/1991 |
| WO | 96/21701 | | 7/1996 |

OTHER PUBLICATIONS

International Search Report dated Mar. 12, 2009, from corresponding PCT application.
Japanese Office Action, dated Oct. 18, 2012, from corresponding Japanese application.

* cited by examiner

*Primary Examiner* — Michael C Miggins
(74) *Attorney, Agent, or Firm* — Young & Thompson

(57) ABSTRACT

A method for applying an elastomer on a sheath (2) includes the step of applying by pad-printing an elastomer layer on a portion (20) of the sheath (2). A pad-printing machine (1) is also provided for implementing the method. The invention can particularly be used for textile sheaths used in the protection of exhaust-gas flow pipes in an automobile.

20 Claims, 4 Drawing Sheets

METHOD FOR APPLYING AN ELASTOMER ON A SHEATH

BACKGROUND OF THE INVENTION

1. Field of the Invention

Figure 1:
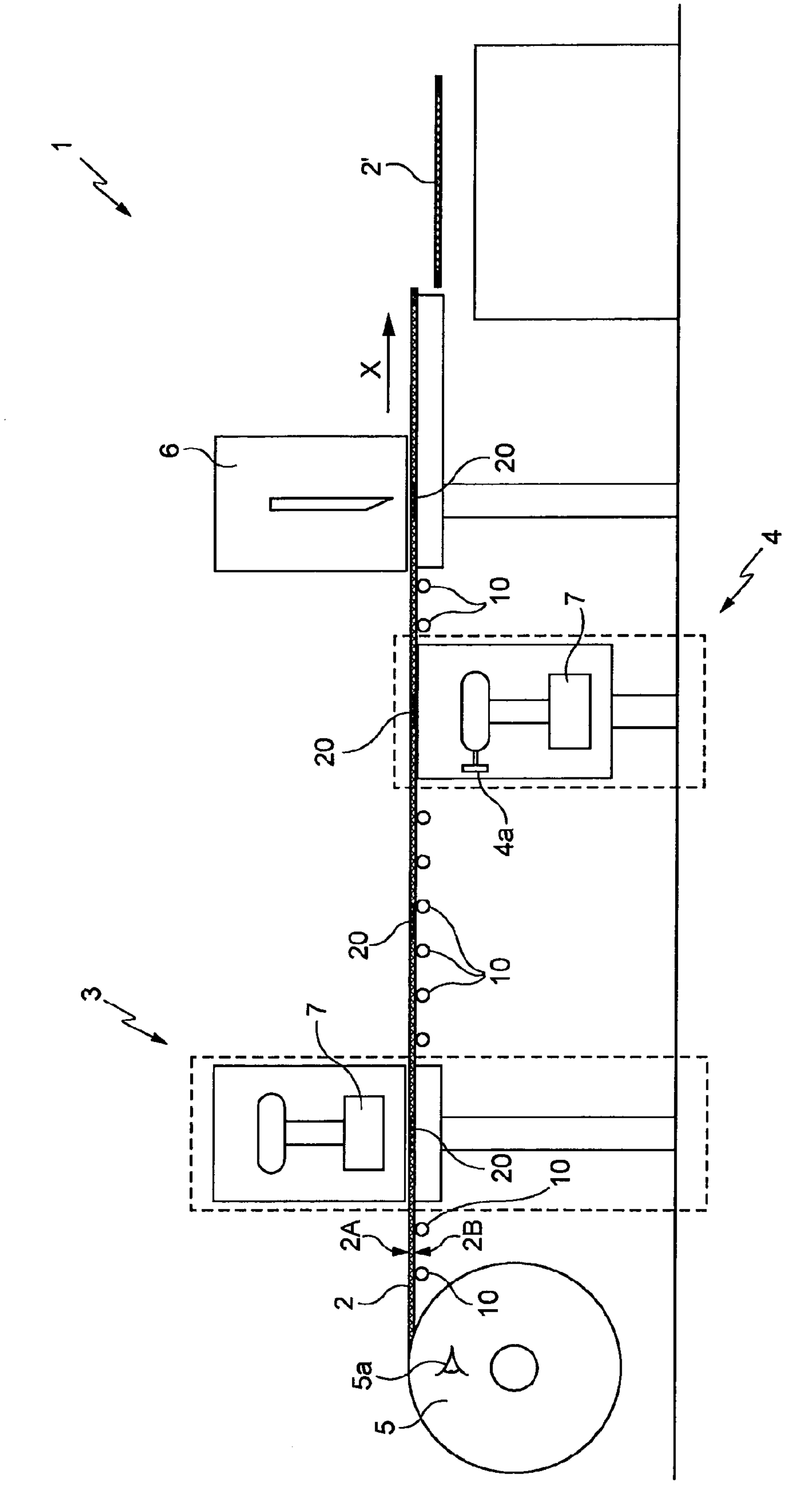

The present invention concerns a method for applying an elastomer on a sheath.

It also concerns a pad printing machine adapted to use that method.

The invention further concerns a protective sheath and more particularly a textile sheath (i.e. a sheath consisting of interlaced filaments) coated with an elastomer layer obtained by this method and cut to length.

In particular, the present invention finds its application in textile sheaths used for the protection of exhaust gas recycling (EGR) tubes in motor vehicles.

These textile, generally knitted, sheaths are obtained by cold cutting into longitudinal sections of predetermined length a textile sheath of great length, possibly measuring up to several meters.

2. Description of the Related Art

When a textile sheath is cut to length, the ends of the sheath splay and this splaying is accentuated by handling.

Thus the sheath is deformed at the ends and loses its protective characteristics when it is installed around a tube or a pipe.

In a correlated way, cutting the sheath causes pollution because pieces of the filaments are detached from the sheath.

In particular stitches are cut when a knitted sheath is cut to length. Pieces of the filaments of these stitches are detached from the sheath, causing pollution.

One solution for preventing pollution by cutting the sheath to length consists in passing the sheath over vibrating tables to eliminate the pieces of the stitches detached from the sheath.

This solution cannot achieve satisfactory pollution prevention if pieces of the stitches detached from the sheath remain stuck to the sheath and become detached only when the sheath is transported or when the sheath has been installed.

Furthermore, this solution prevents neither deformation of the sheath nor splaying of the ends.

The document U.S. Pat. No. 5,186,992 describes a method for avoiding splaying of the ends of the sheath after cutting.

The method consists in applying an elastomer by passing the sheath into a bath of liquid elastomer. The sheath covered with elastomer is then dried in a hot air oven at a temperature of around 150° C.

However, the elastomer layer obtained by this method is not uniform and is thicker than necessary. This implies an excessive consumption of elastomer as well as imprecise application of the elastomer.

Furthermore, heating the sheath can lead to deformation of the sheath by modification of the dimensions and elasticity of the sheath.

SUMMARY OF THE INVENTION

An object of the present invention is to eliminate the aforementioned drawbacks and to propose a method for applying an elastomer on a sheath that reduces the pollution produced by the sheath when cut to length, splaying at the ends and deformation of the ends of the sheath.

To this end, a first aspect of the present invention provides a method of applying an elastomer to a sheath consisting of interlaced filaments, characterized in that it includes a step of depositing an elastomer layer on a portion of the sheath by a pad printing process, the elastomer layer being adapted to bond the interlaced filaments of the sheath.

Thus the elastomer layer deposited by pad printing is uniform and of adequate thickness, avoiding excess elastomer. This saves on elastomer and makes the elastomer deposit more precise.

Furthermore, the saving on the elastomer is increased given that the elastomer is deposited only on portions of the sheath and not over the entire length of the sheath.

Consequently, when the sheath is cut to length in its portions coated with elastomer, the ends of the sheath do not splay and are not deformed. Moreover, the ends are not deformed once the sheath is installed on a tube or a pipe (even if the tube or pipe reaches a high temperature).

Moreover, if the sheath is a textile sheath, pollution caused by pieces of filament detached from the sheath is greatly reduced.

In one advantageous embodiment of the invention applied to a flexible sheath, the pad printing deposition step is effected on a portion of a first face of the flattened sheath.

Thus the sheath is flattened and an elastomer layer is deposited onto a sheath portion located on one face of the sheath.

This method can thus be implemented easily using a pad applicable to a plane face of the sheath.

According to advantageous features, the method further includes a second step of depositing an elastomer layer on a portion of a second face of the flattened sheath by a pad printing process.

Thus an elastomer layer can be deposited on sheath portions located on both faces of the sheath.

The portions of the first and second faces are preferably disposed substantially in the same transverse portion of the sheath.

Consequently, if the sheath is tubular, for example, a transverse sheath portion is coated with the elastomer layer all around the tubular surface.

According to a preferred feature, the method includes a step of controlling the mechanical tension in the sheath in the longitudinal direction.

Thus the mechanical tension in the sheath is controlled so that the sheath is not excessively stretched or relaxed in order for the elastomer to be deposited uniformly and efficaciously.

Consequently, if the sheath is a textile sheath, the spaces between the interlaced filaments are fixed and determined so that the sheath is covered with an elastomer layer adapted to bond the interlaced filaments to each other without the interlaced filaments of the first face of the sheath being bonded to the interlaced filaments of the second face.

The elastomer is advantageously polychloroprene.

This type of elastomer has viscosity characteristics appropriate for its use on a pad and a plate during the pad printing deposition step.

Moreover, the deposited elastomer layer is uniform and dries instantaneously. Thus it is not necessary to heat the sheath to dry it and it is possible to cut the sheath to length immediately after deposition by pad printing.

A second aspect of the present invention provides a pad printing machine including at least one pad printing module adapted to deposit an elastomer layer on a sheath portion and including a tank containing an elastomer, characterized in that it includes downstream of said at least one pad printing module cold cutting means adapted to cut the sheath in that portion.

This machine has features and advantages analogous to those described hereinabove with reference to the method.

The pad printing machine advantageously includes two pad printing modules adapted to be disposed facing two respective faces of the sheath, one of the pad printing modules including a pad mounted on means for pivoting it by 180°.

Thus it is possible to apply an elastomer layer to both faces of the sheath in the same pad printing machine.

According to one practical feature of the invention, each pad printing module includes a pad including a recess substantially at the center of the pad.

Thus the pressure exerted by the central part of the pad is lower than the pressure exerted by the edges of the pad and consequently the elastomer does not flow beyond the edges of the pad during the step of deposition by pad printing.

According to one feature of the invention, each pad printing module includes a plate wider than said sheath when flattened and between 25 mm and 60 mm long.

Thus the entire width of the sheath coated with the deposited elastomer layer and the length of the portion comprising the elastomer layer is sufficient to constitute afterwards a cutting area in which the ends of the cut sheath are bonded without using an excessive quantity of elastomer.

A third aspect of the present invention provides a protective sheath including a number of transverse portions including an elastomer layer deposited on the sheath by the application method according to the invention, the transverse portions being spaced from each other and extending over a predetermined length of the sheath in the longitudinal direction.

Thus a very long sheath can be produced, the transverse portions coated with elastomer afterward constituting cutting areas for cutting the sheath to length.

This sheath has features and advantages analogous to those described above with reference to the method and the pad printing machine.

Finally, a fourth aspect of the invention provides a sheath consisting of interlaced filaments cut to length by cold cutting the ends of said sheath.

According to the invention, this sheath consists of interlace filaments and when cut to length includes at the ends two respective spaced end portions coated with an elastomer layer applied by the application method according to the invention.

BRIEF DESCRIPTION OF THE DRAWING FIGURES

Other features and advantages of the invention will become more apparent in the following description.

Figure 2A:
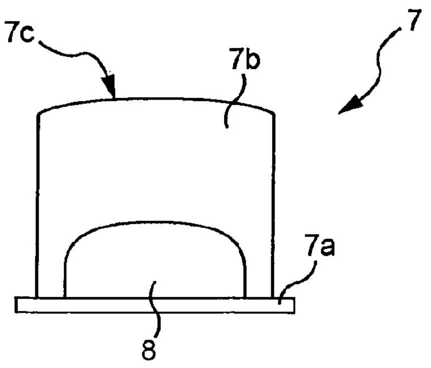
Figure 2B:
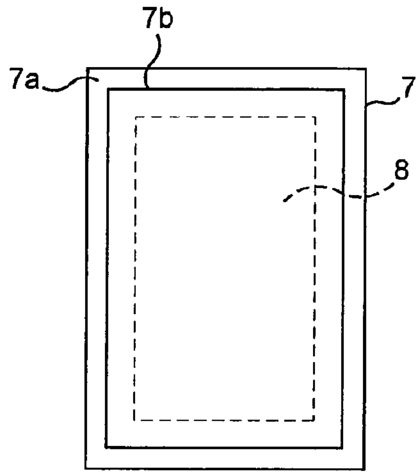

In the appended drawings, which are provided by way of nonlimiting example:

FIG. 1 is a side view of a pad printing machine conforming to a first embodiment of the invention;

FIG. 2*a* is a diagram showing a front view of a pad of a first embodiment of the invention;

FIG. 2*b* is a diagram showing a plan view of the pad from FIG. 2*a;*

Figure 3A:
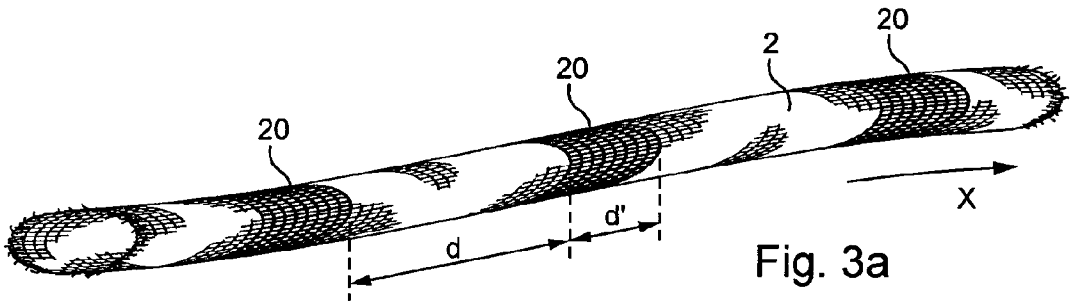
Figure 3B:
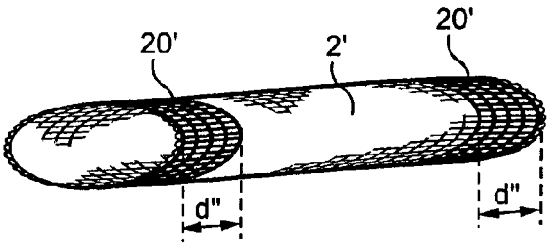
Figure 4A:
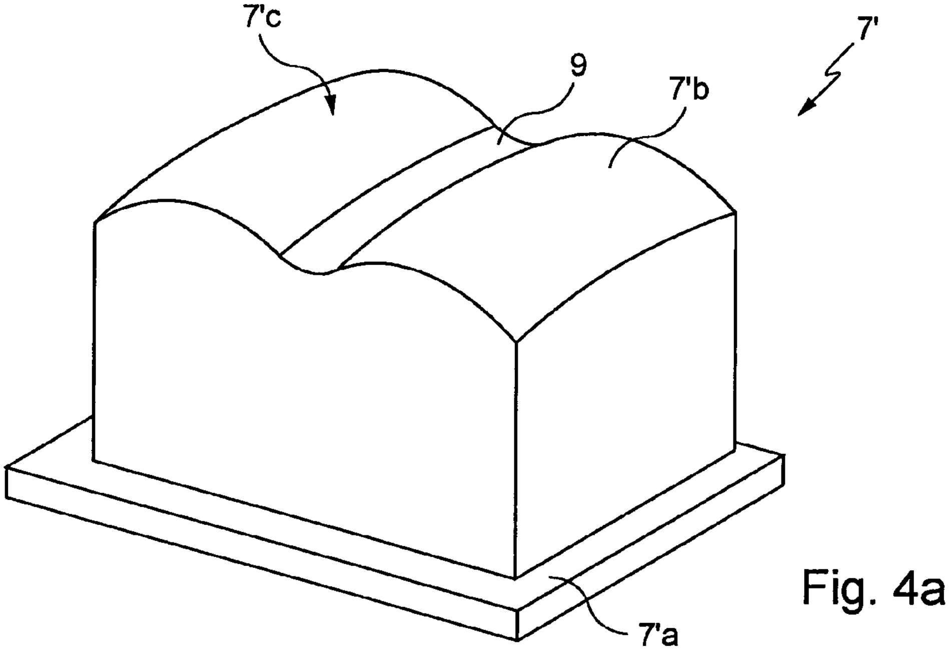
Figure 4B:
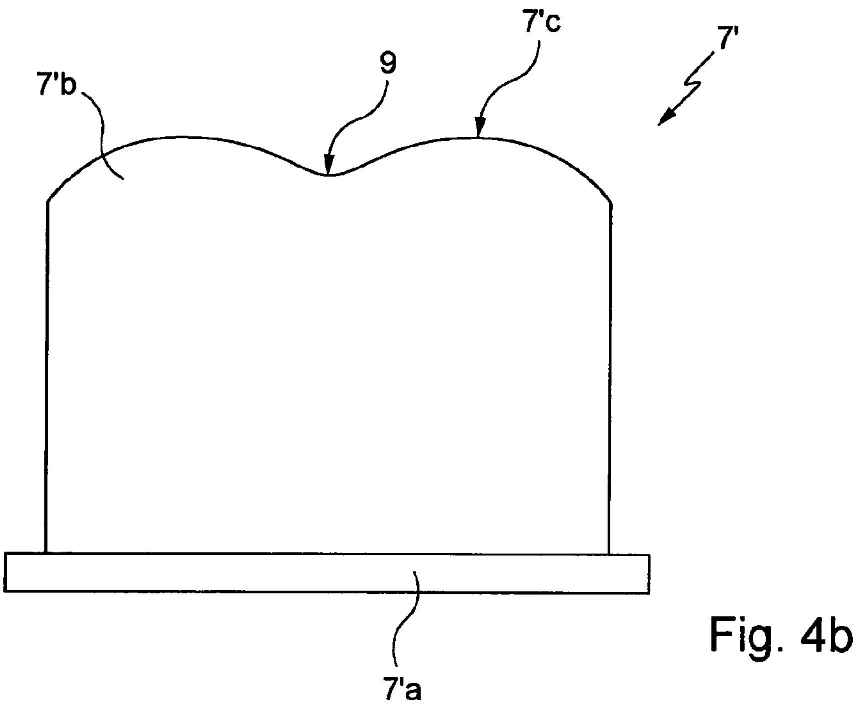

FIG. 3*a* is a diagram showing a textile sheath of the invention;

FIG. 3*b* is a diagram showing a textile sheath of the invention cut to length;

FIG. 4*a* is a diagrammatic perspective view of a pad of a second embodiment of the invention;

FIG. 4*b* is a diagrammatic front view of the pad from FIG. 4*a*; and

Figure 5:
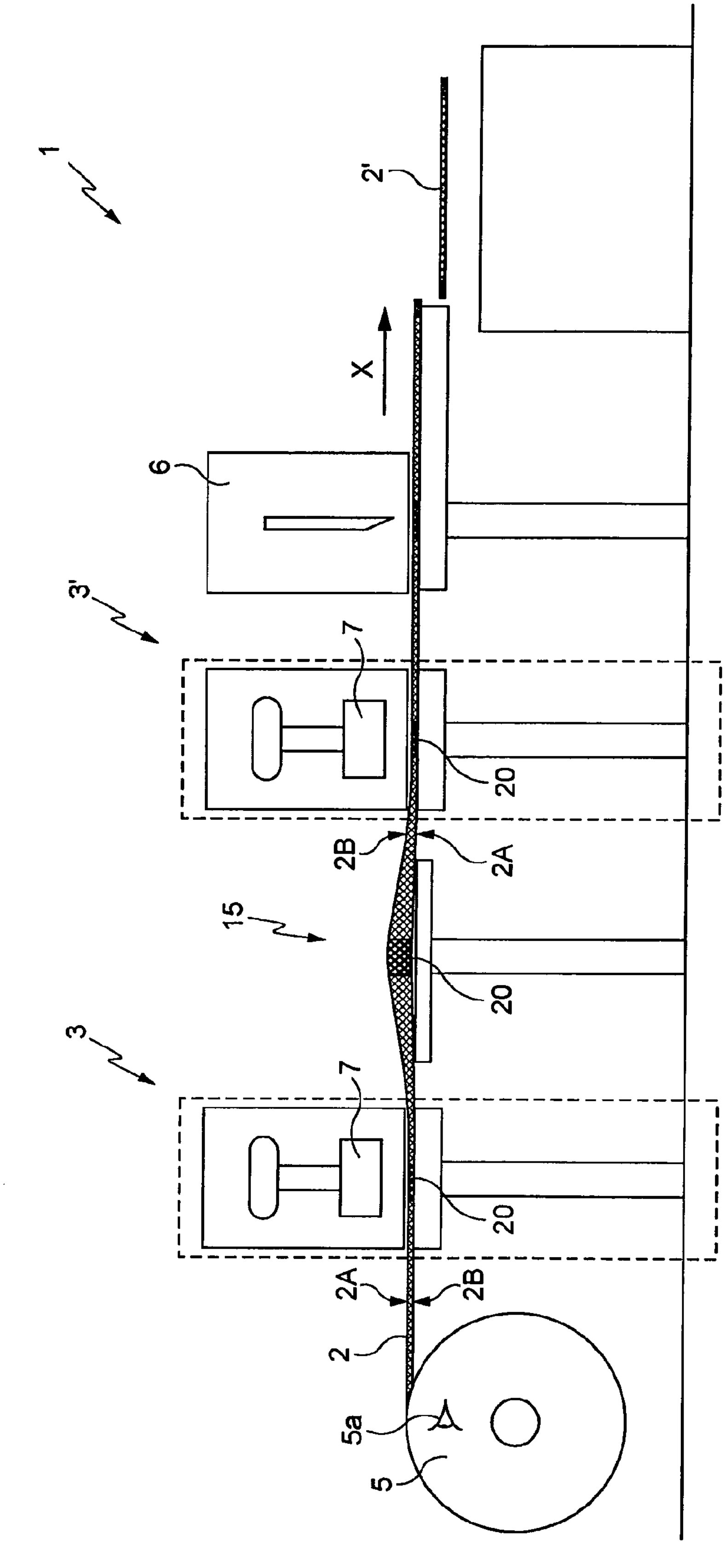

FIG. 5 is a diagram analogous to FIG. 1 showing a pad printing machine conforming to a second embodiment of the invention.

DETAILED DESCRIPTION OF THE INVENTION

A pad printing machine of the invention used to deposit an elastomer on a sheath is described first with reference to FIG. 1.

In this embodiment of the invention, the method is applied to a tubular textile sheath 2.

By way of nonlimiting example, this sheath 2 is a textile sheath knitted from glass fiber multifilaments impregnated with an acrylic solution containing graphite. Thus the sheath 2 is flexible and can be flattened.

Of course, the sheath 2 can be manufactured in other materials, for example silica, ceramic or polymer. In the case of a textile sheath, the sheath can for example consist of knitted, woven or braided multifilaments or monofilaments.

The flattened sheath 2 is transported along the pad printing machine 1 by standard conveyor means 10, such as a succession of drive rollers, for example.

In this embodiment, the machine 1 includes two pad printing modules 3, 4. Each pad printing module 3, 4 includes a pad 7 like that shown in FIGS. 2*a* and 2*b* or a pad 7' like that shown in FIGS. 4*a* and 4*b*. The pad 7, 7' is described hereinafter.

This pad printing module 3, 4 is analogous to a pad printing device used in conventional pad printing. It includes a tank that contains the elastomer to be applied.

This tank corresponds to the ink tank used in conventional pad printing.

This tank is closed to prevent elastomer solvent vapor escaping. In the standard manner, in addition to the pad 7, the pad printing modules 3, 4 include a plate, not shown, that is described hereinafter.

As described in detail hereinafter with reference to the method used by the pad printing machine to produce an elastomer deposit on two opposite faces 2A, 2B of the sheath 2, one of the pad printing modules, here the second pad printing module 4, for example, includes pivoting means 4*a* on which the pad 7 is mounted.

These pivoting means 4*a* are adapted to pivot the pad 7 through an angle of approximately 180° in order to enable it to be applied to a second face 2B of the sheath 2 circulating in the pad printing machine 1, which in this embodiment is a lower face of the sheath.

The pad printing machine 1 further includes means 5 for controlling the mechanical tension in the sheath 2 associated with a sensor 5*a* for monitoring the tension.

The pad printing machine 1 includes cold cutting means 6 in order to cut the sheath 2 to length once an elastomer layer has been deposited by pad printing.

Thus on leaving the pad printing machine 1 the sheath 2' is cut to length, thus being ready to be used, for example to protect an exhaust tube of a motor vehicle.

The elements of the pad printing machine 1, in particular the pad printing modules 3, 4, the means 5 for controlling the mechanical tension of the sheath 2, the conveyor means 10 and the cold cutting means 6, are connected to an electronic circuit card for controlling the operation of the pad printing machine 1.

In a manner known in the art this electronic circuit card includes a microprocessor for executing an algorithm described hereinafter to apply elastomer to the sheath 2.

In particular, to enable use of the method described hereinafter of applying an elastomer, the control electronic circuit card also includes a non-volatile memory adapted to store parameters such as, for example, the appropriate mechanical tension in the sheath to which the elastomer is to be applied, the speed at which the sheath 2 must advance along the pad printing machine 1 and in front of the pad printing modules 3, 4, the times at which the steps of the method must be executed, the elastomer deposition cycle and the adjustment of the movement of the pad 7 (in particular the vertical movement of the pad 7 and the pivoting movement of the pad 7 of the second pad printing module 4).

A method conforming to one embodiment of the invention of applying an elastomer to a sheath is described next.

As is clear from FIG. 1, the steps of this method are executed sequentially according to the position of the sheath 2 along the pad printing machine 1.

This method includes a step of depositing an elastomer layer on a portion 20 of the sheath 2 by a pad printing process.

This pad printing deposition step is effected on a portion 20 of a first face 2A of the flattened sheath 2 by a first pad printing module 3.

In this embodiment, the method includes a second step, once the above pad printing step has been carried out, of depositing an elastomer layer on a portion 20 of a second face 2B of the flattened sheath 2 by the pad printing process.

This second deposition step is executed by the second pad printing module 4.

In practice, this second pad printing module 4 is disposed under the sheath 2 circulating in the pad printing machine 1.

The pad 7 is mounted on pivoting means 4*a* to allow pad printing on the lower face of the sheath 2, as explained above.

In the same manner as in conventional pad printing, the pad printing deposition steps are executed by the pad 7 and a plate. The elastomer deposited on the pad is transferred onto the sheath 2 by the pad 7.

More particularly, in the second pad printing module 4, the pad 7 is pivoted 180° after transfer of the elastomer by the plate and before its vertical movement against the second face 2B of the sheath 2.

The plate is for example a metal plate comprising an imprint to be transferred to the sheath 2. This imprint is etched in the plate and is filled with elastomer by techniques used in conventional pad printing.

Thus the thickness of the elastomer layer deposited on the sheath is a function of the depth of the imprint etched on the plate.

This depth has a value of between 50 and 130 μm inclusive, for example, preferably of 90 μm.

As indicated above, the elastomer used by the pad printing machine 1 is in a closed tank so that the elastomer does not dry out through contact with the air.

The portions of the first face 2A and the second face 2B of the sheath 2 are advantageously disposed substantially in the same transverse portion of the sheath 2.

Nevertheless, because of the tolerance of the pad printing machine 1, it is possible to have an offset of a few millimeters between the portion 20 of the first face 2A and the portion 20 of the second face 2B.

In this embodiment, elastomer is deposited over the entire width of the flattened sheath 2.

Thus in this example of a tubular sheath 2 the transverse sheath portion is coated with the elastomer layer all around the tubular surface of the sheath 2.

For this, the plate has a rectangular shape.

The width of the plate is preferably greater than the width of the flattened sheath. For example, the width of the plate is between 40 mm and 60 mm inclusive for a sheath with a width substantially equal to 25 mm.

This ensures application of elastomer over the entire width of the flattened sheath.

The length of the plate corresponds to the length of the transverse portion on which the elastomer layer is deposited.

Here the length d' of the portion 20 and the plate is between 25 and 60 mm inclusive, for example, and preferably between 30 and 35 mm (see FIG. 3*a*).

Of course, the plate can have other shapes and dimensions.

FIG. 3*a* shows a textile sheath 2 having at least one portion 20 coated with an elastomer layer applied by the method of the invention.

In practice, such a sheath comprises a number of transverse portions 20 comprising an elastomer layer deposited on the sheath 2, the transverse portions 20 being spaced from each other and extending over a predetermined length d' of the sheath in the longitudinal direction X.

The distance d separating two consecutive portions 20 has a predetermined value that is a function of the required length of a sheath 2' when cut to length, for example.

A textile sheath 2' cut to length is described next with reference to FIG. 3*b*. This textile sheath 2' cut to length by cold cutting the ends of the sheath comprises two end portions 20' coated with an elastomer layer applied by the application method of the invention.

This sheath 2' is cut to length by the cold cutting means 6 of the pad printing machine 1.

These means 6 cut the sheath 2 comprising transverse portions 20 coated with elastomer substantially in the middle of a first portion 20 and then substantially in the middle of a second portion 20. A sheath 2' cut to length is obtained in this way.

By way of illustration, to be effective, the length d" of the end portions 20' must be at least 10 mm.

Thus if the length d' of a transverse portion 20 comprising an elastomer layer is 20 mm, for example, the length d" of the end portion 20' is 10 mm.

The elastomer used in this example is polychloroprene from Du Pont de Nemours, better known as Neoprene®.

Accordingly, because of the characteristics of this particular elastomer, the elastomer layer dries rapidly in the open air. It is not necessary to dry the elastomer layer by applying heat.

Thus the transverse portions 20 of the sheath 2 coated with an elastomer layer can be cold cut directly after the pad printing steps. Sheaths 2' cut to length are obtained.

Moreover, Neoprene® is an elastomer that is highly resistant to high temperatures. Thus a sheath cut to length and installed on an exhaust tube, for example, is neither deformed nor splayed at the ends, thus remaining in place on the tube. On raising the temperature of an exhaust tube after mounting the cut to length sheath 2' on the tube, the elastomer crystallizes on the sheath and shrinks slightly, helping to retain the cut to length sheath 2' in place on the tube.

Moreover, no pollution is caused by loss of filaments from the stitches of the sheath 2.

The method further includes a step of controlling the mechanical tension in the sheath 2 in the longitudinal direction X.

Thus the mechanical tension has a predetermined value that is a function in particular of the material of the sheath and its structure (woven, braided or knitted).

Thus the sheath is relatively taut so that depositing an elastomer layer by pad printing does not cause bonding between the first face 2A of the sheath 2 and the second face 2B of the sheath 2 and assures homogeneous pad printing on the sheath 2.

At the same time, the sheath is fairly relaxed, so that the elastomer also penetrates between the filaments and bonds them to each other.

A pad conforming to one embodiment of the invention is described next with reference to FIGS. 2*a* and 2*b*.

The pad 7 includes a support part 7*a* and a pad printing part 7*b* having an active part on a pad printing surface 7*c*.

This pad 7 preferably further includes a recess 8 situated at the center of the pad 7.

Thanks to this recess 8, the pressure applied to the sheath at the center of the pad is lower. This accentuates the flow of the elastomer toward the central part of the pad 7 during the step of deposition by pad printing, thus optimizing the quantity of elastomer deposited.

The pad printing part 7*b* of the pad 7 is produced in silicone, for example, with a Shore hardness between 5 and 70, inclusive. The support part 7 can be produced in steel.

As shown in FIGS. 2*a* and 2*b*, the recess 8 can be produced inside the pad printing part 7*b* of the pad 7.

More particularly, this recess 8 is formed by an absence of material in a central area of the pad printing part 7*b* coming into contact with the support part 7*a*.

The active face 7*c* of the pad is substantially convex.

Of course, other types of pad can be used in the pad printing machine 1 of the invention.

A second embodiment is shown by way of example in FIGS. 4*a* and 4*b*.

As before, the pad 7' includes a support part 7'*a* and a pad printing part 7'*b* having an active part on the pad printing surface 7'*c*.

As before, it includes a recess 9 located at the center of the pad 7'.

As before, this recess 9 optimizes the quantity of elastomer deposited and accentuates the flow of the elastomer toward the central part of the pad 7'.

In this embodiment, the recess 9 is produced in the pad printing surface 7'*c*.

As shown in FIGS. 4*a* and 4*b*, the pad printing surface 7'*c* consists of two convex portions extending symmetrically on the pad printing surface 7'*c* and merging substantially at a center line of the pad printing surface 7'*c* to form the recess 9.

The recess 9 is like a groove in the widthwise direction of the pad 7' and when this pad 7' is used it is disposed transversely to the longitudinal direction X of the sheath 2.

Of course, numerous modifications can be made to the embodiments described above without departing from the scope of the invention.

In particular, referring again to the pad printing machine shown in FIG. 1, the pad printing modules 3, 4 could be disposed one above the other so that the elastomer layer is applied simultaneously to the two faces 2A, 2B of the sheath.

Moreover, as shown in FIG. 5, instead of using a pad printing module 4 with pivoting means 4*a* for the pad 7 it would be possible to use two identical pad printing modules 3, 3' disposed successively in the longitudinal direction X of transfer of the sheath 2 in the pad printing machine 1.

Elements in FIG. 5 common to FIG. 1 carry the same reference numbers and are not described again hereinafter.

In this particular embodiment, means 15 for turning the sheath over are disposed between the two pad printing modules 3, 3'.

In practice, these turning over means 15 can consist of guide rails adapted to turn the sheath through an angle of approximately 180°.

To encourage sliding and transfer of the sheath, these guide rails can be coated with a material of the polytetrafluoroethylene (PTFE) type (Teflon®) from Du Pont de Nemours.

In this embodiment, once the step of deposition by the first pad printing module 3 is completed, there follows a step of turning the sheath 2 over about a longitudinal axis X of the sheath, through approximately 180°, so that a second face 2B of the sheath 2 is ready to receive an elastomer layer deposited by pad printing.

Thus the method then includes a second step of depositing an elastomer layer by pad printing that is performed by the second pad printing module 3'.

It will be noted in particular that by using a quick-dry elastomer it is possible to deposit the elastomer layers on the two faces 2A, 2B of the sheath successively by turning over the sheath.

Other modifications could be made to the above embodiments.

Thus each pad printing module could include a number of pads in order to deposit a respective elastomer layer onto a number of sheaths.

Moreover, the pad printing machine could comprise a variable number of pad printing modules.

Moreover, the sheath could be adapted to be opened out longitudinally, for example. It would then be possible to deposit an elastomer layer onto a flattened portion of the sheath using only one pad printing module.

Furthermore, the pad printing machine could include, between two consecutive pad printing modules, means for shifting the sheath transversely. Thus the elastomer layer could be deposited on the whole of the width of the flattened sheath using a plate smaller than the width of the flattened sheath.

Thus according to the invention it is possible to apply a uniform elastomer layer of adequate thickness to portions of a sheath by a pad printing process without using an excessive quantity of elastomer.

Consequently, the sheath when cut to length comprises two end portions covered with the elastomer layer, the ends not splaying and not being deformed.

The invention claimed is:

1. A method of applying an elastomer to a sheath (2) of interlaced filaments, comprising:
- depositing an elastomer layer on a portion (20) of said sheath (2) by a pad printing process, the elastomer layer being adapted to bond the interlaced filaments of said sheath.

2. The method according to claim 1, wherein the method includes a step of controlling mechanical tension in said sheath (2) in a longitudinal direction (X).

3. The method according to claim 1, wherein said elastomer is polychloroprene.

4. The method according to claim 1, applied to a flexible sheath (2), wherein the pad printing deposition step is effected on a portion (20) of a first face (2A) of the flattened sheath (2).

5. The method according to claim 4, wherein the method further includes a second step of depositing an elastomer layer on a portion (20) of a second face (2B) of the flattened sheath (2) by a pad printing process.

6. The method according to claim 5, wherein said portions (20) of the first face (2A) and the second face (2B) are disposed substantially in the same transverse portion (20) of said sheath (2).

7. A pad printing machine (1), comprising:
- at least one pad printing module (3, 3', 4) adapted to deposit an elastomer layer on a sheath portion (2);
- a tank containing an elastomer; and
- downstream of said at least one pad printing module (3, 3', 4) cold cutting means (6) adapted to cut said sheath in said portion.

8. The pad printing machine (1) according to claim 7, wherein each pad printing module (3, 3', 4) includes a plate wider than said sheath (2) when flattened and between 25 mm and 60 mm long.

9. The pad printing machine (1) according to claim 7, including two pad printing modules (3, 4) adapted to be disposed facing two respective faces (2A, 2B) of the sheath, one of the pad printing modules (4) including a pad mounted on means (4*a*) for pivoting the pad by 180°.

10. The pad printing machine (1) according to claim 9, wherein each pad printing module (3, 3', 4) includes a pad (7, 7') including a recess (8, 9) substantially at the center of said pad (7, 7').

11. The pad printing machine (1) according to claim 9, wherein each pad printing module (3, 3', 4) includes a plate wider than said sheath (2) when flattened and between 25 mm and 60 mm long.

12. The pad printing machine (1) according to claim 7, wherein each pad printing module (3, 3', 4) includes a pad (7, 7') including a recess (8, 9) substantially at the center of said pad (7, 7').

13. The pad printing machine (1) according to claim 12, wherein each pad printing module (3, 3', 4) includes a plate wider than said sheath (2) when flattened and between 25 mm and 60 mm long.

14. A protective sheath, comprising:

at least two transverse portions (20) including an elastomer layer deposited on the sheath (2), the transverse portions (20) extending all around the tubular surface of the sheath (2) and being spaced from each other and extending over a predetermined length (d') of the sheath in a longitudinal direction.

15. The protective sheath according to claim 14, wherein the at least two transverse portions constitute respectively two cutting portions of the sheaths.

16. The protective sheath according to claim 14, further comprising:

interlaced filaments cut to length by cold cutting ends of said sheath, including at said ends spaced end portions (20') coated with an elastomer layer.

17. The protective sheath according to claim 16, wherein a length (d") of the end portions (20') of transverse portions (20) is 10 mm or greater.

18. The protective sheath according to claim 17, wherein a length (d') of the transverse portions (20) is 20 mm and the length of the end portions (d") is 10 mm.

19. The protective sheath according to claim 14, wherein a length (d") of end portions (20') of the transverse portions (20) is 10 mm or greater.

20. The protective sheath according to claim 19, wherein the length of the transverse portions (d') is 20 mm and the length of the end portions (d") is 10 mm.

* * * * *